Patented Nov. 29, 1938

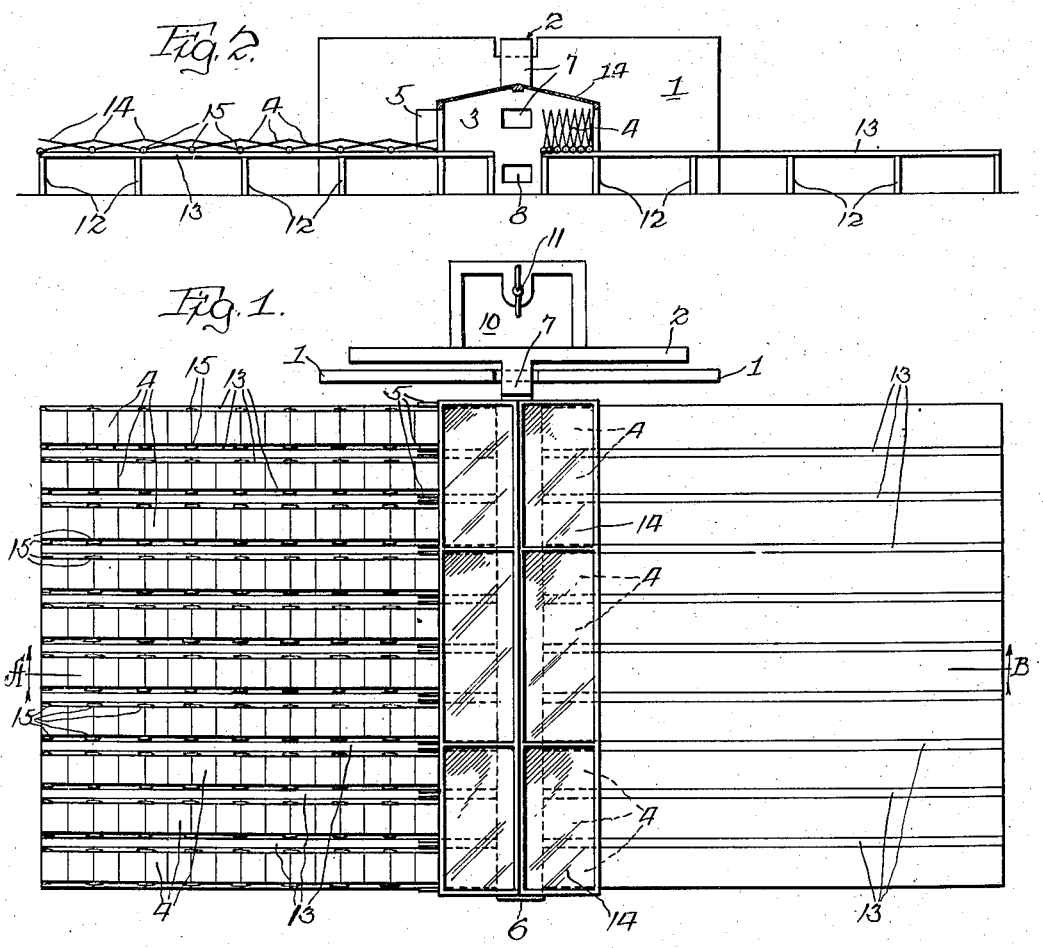

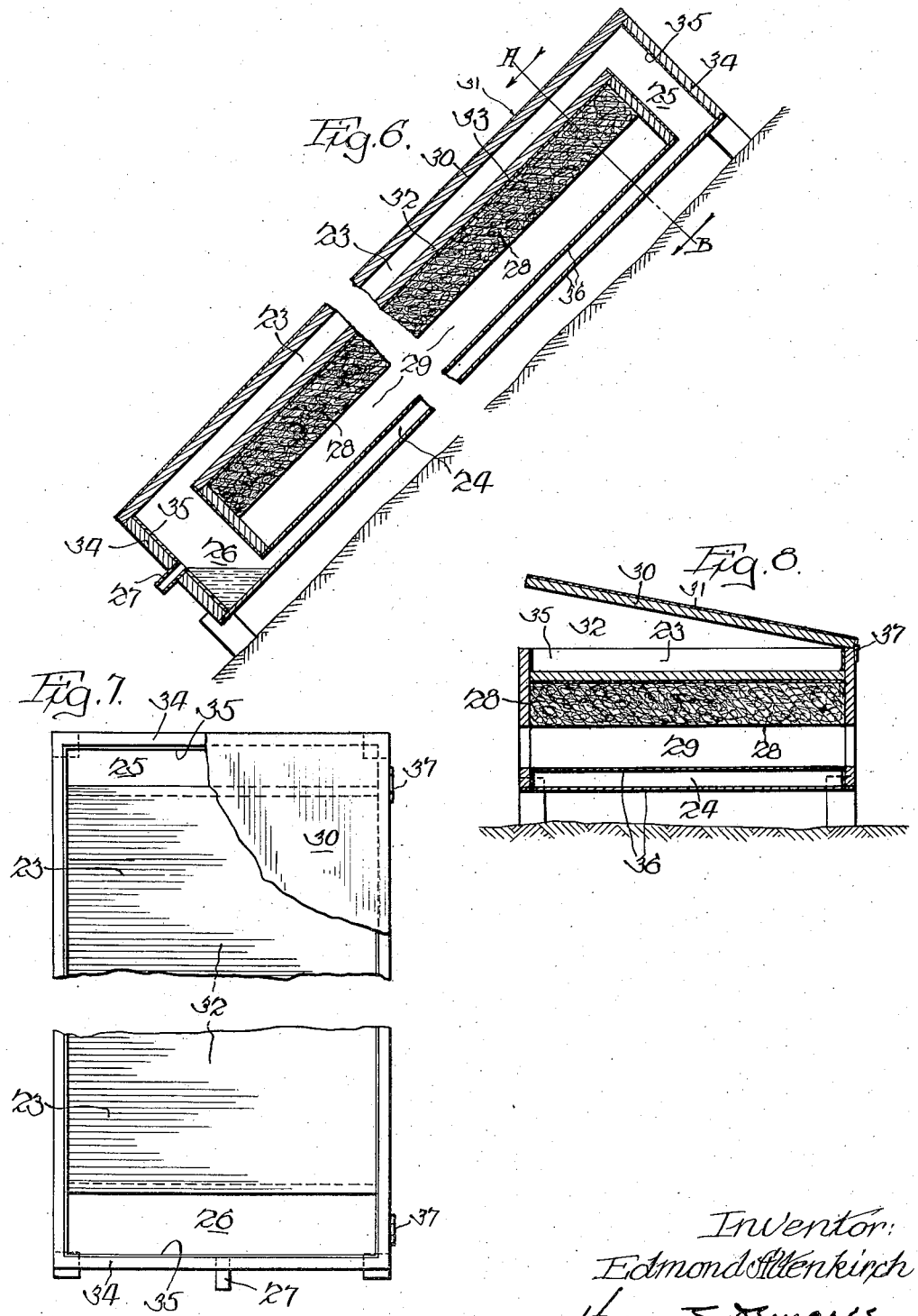

2,138,689

UNITED STATES PATENT OFFICE 2,138,689

METHOD FOR GAINING WATER OUT OF THE ATMOSPHERE

Edmund Altenkirch, Neuenhagen, near Berlin, Germany

Application October 18, 1934, Serial No. 748,974
In Germany September 28, 1933

11 Claims. (Cl. 202—39)

It has been proposed to obtain water out of the atmospheric air in dry regions by causing a current of atmospheric air to be conducted over an aqueous solution. The air may first cause the evaporation of water out of the solution, under the influence of the sun's rays. Part of the water thus evaporated may be liquefied again in a part of the apparatus located in the shade, while the remainder and an additional quantity of water may be absorbed by the solution in a part of the apparatus also located in the shade, before the air returns to the atmosphere. To make the process continuous the solution may circulate between the part of the apparatus where the water is evaporated under the influence of the sun's rays and between the part where the solution is saturated again in the shade.

This method makes it possible to gain water from very dry air. It has, however, the disadvantage that large cooling surfaces are necessary for those parts where the solution becomes saturated.

It is an object of the present invention to overcome this disadvantage in gaining water out of the atmosphere, and to make the method of gaining water so economical that it can be performed practically in many cases. This object can be accomplished by taking into account the large difference between the temperature due to the sun's rays during the day time and the low temperature during the night time. In this connection it is important to note that the relative humidity of the atmospheric air, even in the driest regions, is considerably higher during the night than during the daytime. The re-humidification of the treated air can then be effected in the open without special surfaces for the discharge of heat or special air channels.

According to the invention, water may be gained out of the atmospheric air by exposing hygroscopic substances to the atmospheric air during the night so that water is thereby absorbed, and subsequently subjecting the substance to the sun's rays during the daytime so that the absorbed water is evaporated into an air current which is cooled in order to liquefy the water.

The cooling of the moist air can be effected by cold stored during the night, or simply by the temperature of the air in the shade.

In order to utilize the lifting effect of warm air for producing an effective air current, it is advantageous to heat the air by the sun's rays at a lower point than the point where the cooling of the air in a descending conduit or vessel takes place.

If the air current used to carry out the process is taken out of the open air, a great deal of the water stored in the hygroscopic substances during the night time will be wasted in increasing the moisture of the air, flowing through the absorption material, to bring the air up to the condensation point in the shade, because the relative humidity of the air is low during the day time. Too large an air current would even prevent the condensation point being reached, particularly if the water in the hygroscopic substance is nearly exhausted. In this case it is necessary to regulate the rate of air flow to the prevailing state of the substance and to regulate it continuously.

It is, however, much simpler and more effective, if according to the invention, the air is conducted in a closed cycle from the point where heat is supplied and water taken up to the point where cooling and condensation are brought about. This has the further great advantage that the air is enriched to a high water vapor partial pressure, especially at first, when the moisture content of the hygroscopic substances is large, so that the condensation in the shade takes place under a high temperature difference and with high heat transfer. As dehumidification of the hygroscopic substance decreases the quantity of condensate becomes less, the condensation temperature relative to the air in the shade is decreased, the partial pressure in the circulating air returning to the hygroscopic substances heated by the sun's rays becomes lower, and the temperature of the hygroscopic substances is increased, because the cooling effect effected by the evaporation of the water is diminished, but under these circumstances, the de-humidification can still be carried out, and an accommodation to the prevailing conditions effected, if the air is circulated in a closed cycle, so that a good efficiency is secured.

The rate of the air flow can be kept within desired limits by placing resistances in the air circuit. It may be advantageous to use a heat exchanger between the warm air entering and the cool air leaving the condenser.

The relative humidity of the circulating air can be decreased to about 30% at the point where the heat is supplied. This corresponds to an increase of temperature of 20° C. by the sun's rays. If the water is removed from the hygroscopic substances to that limit, 70% of the water which can be taken up by the substances will be expelled in many cases. A further decrease of temperature at the condenser with the aid of cold stored during the night would therefore be of only little effect, and would increase the difficulties still more.

It is advantageous to provide the vessel in which the evaporation of the water is effected by the sun's rays with glass windows, so that the sun's rays can penetrate into it and so that the hygroscopic substances can be piled up higher in order to save room.

Solid absorption substances are more advantageous than liquid because the latter collect foreign matter or become dirty. The use of wood is particularly advantageous as absorption substance in plants of this kind. Wood is not only very cheap, but can be made into any shape and can be piled up easily. Also, it takes up water so well at high air humidity that it is not much surpassed even by the best and most expensive known absorption substances. The temperatures to which the wood is exposed by the sun's rays do not decrease this effect. In order that the wood can follow the repeated humidification and de-humidification in the given time of 24 hours, it is advantageous to use the wood in the shape of thin boards or shavings of a thickness of a few millimeters. The penetration of the wood with moisture or the removing of the moisture can be effected particularly fast, if the pieces of wood which are used are cut at right angles or approximately right angles to the fibres.

Other objects and advantages reside in certain novel features of the arrangement as will be apparent from the following description taken in connection with the accompanying drawings in which: Figure 1 is a plan view of an apparatus for carrying out the principles of the invention;

Figure 2 is a cross-sectional view of the arrangement of Figure 1, the view being taken on the line A—B of Figure 1;

Figure 3 is a transverse cross-sectional view of the arrangement of Figure 1;

Figure 4 is a fragmentary view of some lazy tongs used in the arrangement of Figure 1;

Figure 5 is a fragmentary side view of the device of Figure 4;

Figure 6 is a fragmentary vertical cross-sectional view of a portable apparatus for carrying out the principles of the invention;

Figure 7 is a fragmentary plan view of the arrangement of Figure 6; and

Figure 8 is a transverse cross-sectional view of the arrangement of Figure 6, the view being taken on the line A—B of Figure 6.

In Figures 1, 2 and 3, a wall or hedge is designated by 1. In the shade of it the condenser 2 is arranged. At the sun side of this wall a room 3 is located which contains the hygroscopic substances 4 during the daytime and which may serve, for instance, also as greenhouses. In the side walls, windows 5 are provided some of which are opened. 6 is the door. The room 3 is connected with the condenser 2 at the top through air conduit 7 and at the bottom through air conduit 8. A conduit 9 which forms a liquid seal leads from the condenser 2 to the storage tank 10 from which the water can be withdrawn with the aid of pump 11. 12 are posts provided with rails 13 on which the wood pieces hingedly connected crosswise, according to Fig. 4, can be spread out if they are drawn out of room 3. The room 3 is covered with glass 14 strengthened by wire screen, thus enabling the sun's rays to penetrate into the room. The wood rests on flanged rollers 15 which are guided by the rails 13 and which allow the pieces of wood to unfold and to fold up. By this arrangement of the wood, a large surface contact with the air is obtained without prohibiting the use of the ground below the wood for other purposes.

The apparatus of Figures 1 to 5 is operated in the following manner. In the evening windows 5 are opened and the wood pieces 4 are drawn out and unfolded thus covering a large surface under the open sky. The wood is saturated during the night corresponding to the relative humidity of the air during the night. If it is a foggy night, the wood can take up water up to 30% of the weight of the dry wood.

In the morning at sunrise the moist wood is folded up into the room 3. The windows are closed. The air and the wood 4 in the room 3 are warmed up by the sun shining through the windows 5 and the glass roof 14. The warmed air is saturated by the evaporation of water out of the wood. The air flows through channel 7 to the condenser 2 located in the shade. By cooling in the shade the moisture taken up by the air in room 3 is liquified and the water flows through pipe 9 into the container 10. The air returns through channel 8 into the room 3 where it takes up water again.

In regions in which a high relative dryness prevails even in the night time, the daily gain of water will be small. The operation can be improved by placing wood, having a large surface in the upper part of the condenser at a place located in the sun during the first hours of the day, say up to noon, but is located in the shade during the last hours of the day. This wood is dried by the sun's rays in the forenoon and the moisture given up to the air is liquified in the condenser. If this wood is cooled in the shade in the afternoon it will take up moisture of the circulating air. In this manner the relative moisture of the circulating air is decreased so far that it can remove much larger quantities of water out of the wood in room 3 which is exposed to the sun's rays. This moisture is stored in the additional wood in condenser 2 and is only evaporated and liquefied in the next forenoon. In this way the wood 4 is brought to a higher degree of dryness and is thus enabled to take up larger quantities of water out of the relative dry air during the night time.

In the example described the hygroscopic substance may also be arranged on little cars or lorries in order to facilitate the removing of the wood out of the room and the carrying back of the wood to the room 3. These lorries can be pushed into the open air through door 6 when the night begins. Because the opening and the closing of the windows can be avoided in this way, it is easier to make the room air-tight. In this case the walls can be provided with double windows in order to increase the rise of temperature during the time of sun radiation while still being air-tight. The means for spreading out the hygroscopic substances—besides wood other organic substances may also be used, i. e., the leaves of some plants—can be varied and adapted to the conditions and the kind of hygroscopic substances. It is important only that the hygroscopic substances are saturated with moisture in the open air during the night time and give up the water to air under the influence of the sun's rays during the day time, the water vapor then being condensed out of the air.

The portable apparatus for gaining water of small quantities, shown in Figures 6 to 8, is located at the south side (for northern regions) of a hill or on a slope 21 on blocks 22.

The compartment 23 for the evaporation of the water is located on the sunny side and the condenser 24 in the shade. They are connected at the top through conduit 25 and at the bottom through conduit 26. Conduit 26 serves also for collecting the condensate which may be drained through pipe 27. The compartment 23 for the evaporation is protected against the loss of heat at the side opposite to the entrance of the sun's rays with the aid of the insulating layer 28. Space 29 allows the atmospheric air to pass the condenser at the outside in order to cool it. During the day time the compartment 23 is covered with a lid consisting of boards 30 which can be opened by turning it around the hinges 37. The lid is covered with a layer of watertight material 31 as for instance asphalt paper, rubber, aluminium, etc. The lower side of the compartment 23 consists also of boards 32 which are protected against the loss of moisture with the aid of a layer 33. Conduits 25 and 26 formed by the boards 34 are covered at the inside by a watertight layer 35 which may consist of aluminium sheet. In the same way the walls of the condenser 24 consist of aluminium sheet or similar material 36.

During the night time the lid 30 is opened as shown in Fig. 7 thus exposing the boards 30 and 32 to the open air. The boards are thus saturated with water. At sunrise cover 30 is closed, the sun heats the compartment 23 and the air which is saturated with moisture evaporating out of the boards flows through channel 25 into the condenser 24 where the water vapor is liquified. The air returns to the compartment 23 through channel 26 where it takes up water again. The side walls of the apparatus may be protected against the rays of the sun with the aid of boards which are leaned against the side walls.

The inclination of the apparatus can be so chosen that the water collected in 26 effects a decrease of the rate of flow circulating through the apparatus, if the circulation becomes so fast that the cooling effect in the condenser 24 is not sufficient. During the day time the apparatus should not be arranged horizontally because then there would be no air circulation. It should, in the same way, particularly in equatorial regions, not be arranged vertically because then the sun's rays would not be utilized sufficiently. Between these limits the inclination can be chosen as desired and can be adapted to the desired rate of flow of the air.

The water obtained can be drained through pipe 27 by inclining the apparatus at any time or it can be scooped up after lifting the cover.

The compartment 23, dried during the day time, is uncovered during the night again in order to be saturated with water.

A portable apparatus as described can of course deliver only a small quantity of water of a few liters per day. It can, however, easily be installed at any place and can easily be enlarged by additional apparatus. The apparatus is adapted for mass production and can therefore be built very inexpensively.

What I claim is the following:

1. Apparatus for obtaining water from the atmosphere comprising a body of hygroscopic material, means for bringing said material and atmospheric air into contact in the night time to cause the material to absorb moisture from the air, a chamber for exposing the material to the heat of the sun in the day time to expel the moisture from the material, a condenser shaded from the sun, and means for causing a current of air to circulate between and through said chamber and said condenser in a closed cycle in the day time to transfer the moisture expelled in the chamber to the condenser where it may be liquified.

2. Apparatus for obtaining water from the atmosphere comprising a body of hygroscopic material, means for bringing said material and atmospheric air into contact in the night time to cause the material to absorb moisture from the air, a chamber for exposing the material to the heat of the sun in the day time to expel the moisture from the material, a second body of hygroscopic material, means for exposing said second body of material to the sun in the forenoon and for shading the same from the sun in the afternoon, and means for causing a current of air to circulate between the two bodies of material to transfer the moisture expelled from the first mentioned body to the second mentioned body.

3. Apparatus for obtaining water from the atmosphere comprising a body of hygroscopic material, means for bringing said material and atmospheric air into contact in the night time to cause the material to absorb moisture from the air, a chamber for exposing the material to the heat of the sun in the day time to expel the moisture from the material, a condenser shaded from the sun, and means for causing a current of air to circulate between and through said chamber and said condenser in a closed cycle in the day time to transfer the moisture expelled in the chamber to the condenser where it may be liquified, the arrangement being such that the various parts of the apparatus are integrally assembled into a compact portable structure.

4. Apparatus for obtaining water from the atmosphere comprising a body of hygroscopic material, means for bringing said material and atmospheric air into contact in the night time to cause the material to absorb moisture from the air, a chamber for exposing the material to the heat of the sun in the day time to expel the moisture from the material, a condenser shaded from the sun, and means for causing a current of air to circulate between and through said chamber and said condenser in a closed cycle in the day time to transfer the moisture expelled in the chamber to the condenser where it may be liquified, the arrangement being such that the chamber which serves to expel moisture from the material may also be used as a greenhouse.

5. Apparatus for obtaining water from the atmosphere comprising a body of hygroscopic material, means for bringing said material and atmospheric air into contact in the night time to cause the material to absorb moisture from the air, a chamber for exposing the material to the heat of the sun in the day time to expel the moisture from the material, a condenser shaded from the sun, and means for causing a current of air to circulate between and through said chamber and said condenser in a closed cycle in the day time to transfer the moisture expelled in the chamber to the condenser where it may be liquified, the hygroscopic material used in said apparatus being wood.

6. Apparatus for obtaining water from the atmosphere comprising a body of hygroscopic material, means for bringing said material and atmospheric air into contact in the night time to cause the material to absorb moisture from the air, a chamber for exposing the material to the heat of the sun in the day time to expel the moisture from the material, a condenser shaded from the sun, and means for causing a current of air to circulate between and through said chamber and said condenser in a closed cycle in the day time to transfer the moisture expelled in the chamber to the condenser where it may be liquified, the hygroscopic material used in said apparatus consisting of wood in the shape of thin sheets.

7. Apparatus for obtaining water from the atmosphere comprising a body of hygroscopic material, means for bringing said material and atmospheric air into contact in the night time to cause the material to absorb moisture from the air, a chamber for exposing the material to the heat of the sun in the day time to expel the moisture from the material, a condenser shaded from the sun, and means for causing a current of air to circulate between and through said chamber and said condenser in a closed cycle in the day time to transfer the moisture expelled in the chamber to the condenser where it may be liquified, the hygroscopic material used in said apparatus consisting of wood cut into pieces along the line at an angle to the direction of its fibers.

8. Apparatus for obtaining water from the atmosphere comprising a body of hygroscopic material, means for bringing said material and atmospheric air into contact in the night time to cause the material to absorb moisture from the air, a chamber for exposing the material to the heat of the sun in the day time to expel the moisture from the material, a condenser shaded from the sun, and means for causing a current of air to circulate between and through said chamber and said condenser in a closed cycle in the day time to transfer the moisture expelled in the chamber to the condenser where it may be liquified, said hygroscopic material consisting of boards connected to form a lazy tongs so that it may be easily spread out or assembled.

9. Apparatus for obtaining water from the atmosphere comprising a body of hygroscopic material, means for bringing said material and atmospheric air into contact in the night time to cause the material to absorb moisture from the air, a chamber for exposing the material to the heat of the sun in the day time to expel the moisture from the material, a condenser shaded from the sun, and means for causing a current of air to circulate between and through said chamber and said condenser in a closed cycle in the day time to transfer the moisture expelled in the chamber to the condenser where it may be liquified, the arrangement being such that said hygroscopic material is spaced above the ground during the night time so as to cause it to come in contact with the air on all sides.

10. The method of separating atmospheric air and water vapor comprising exposing absorbent material to humid air after sundown to absorb water vapor, enclosing said material in an enclosure which will permit the passage of solar heat but which will greatly retard the escape of air whereby the heat of the sun will liberate the vapor into the medium within the enclosure, and circulating said medium through a zone shielded from the heat of the sun whereby the vapor condenses and the partially de-humidified medium is returned to the evaporating zone.

11. The method of separating atmospheric air and water vapor comprising exposing absorbent material to humid air after sundown to absorb water vapor, enclosing said material in an enclosure which will permit the passage of solar heat but which will greately retard the escape of air whereby the heat of the sun will liberate the vapor into the medium within the enclosure, and circulating said medium through a zone shielded from the heat of the sun thermo-syphonically whereby the vapor condenses and collects in a pool and the partially de-humidified medium is returned to the evaporating zone.

EDMUND ALTENKIRCH.